K. F. STAHL.
RECEPTACLE FOR CARBOYS.
APPLICATION FILED JUNE 25, 1908.
1,000,449.
Patented Aug. 15, 1911.
2 SHEETS—SHEET 1.
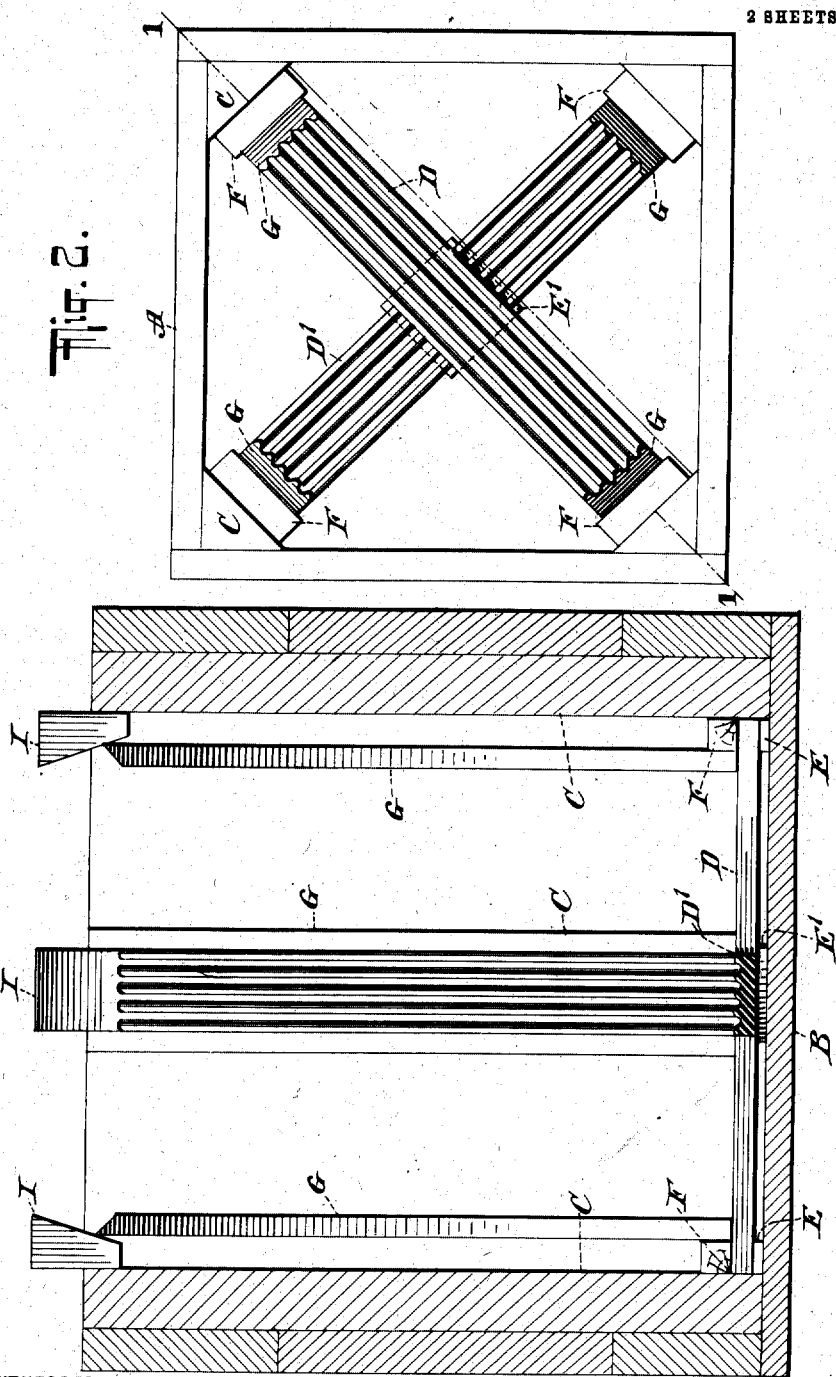
WITNESSES:
John A. Kehlenbeck
John Lotka
INVENTOR
Karl F. Stahl
BY
Briesen & Knauth
ATTORNEYS K. F. STAHL.
RECEPTACLE FOR CARBOYS.
APPLICATION FILED JUNE 25, 1908.
1,000,449.
Patented Aug. 15, 1911.
2 SHEETS—SHEET 2.
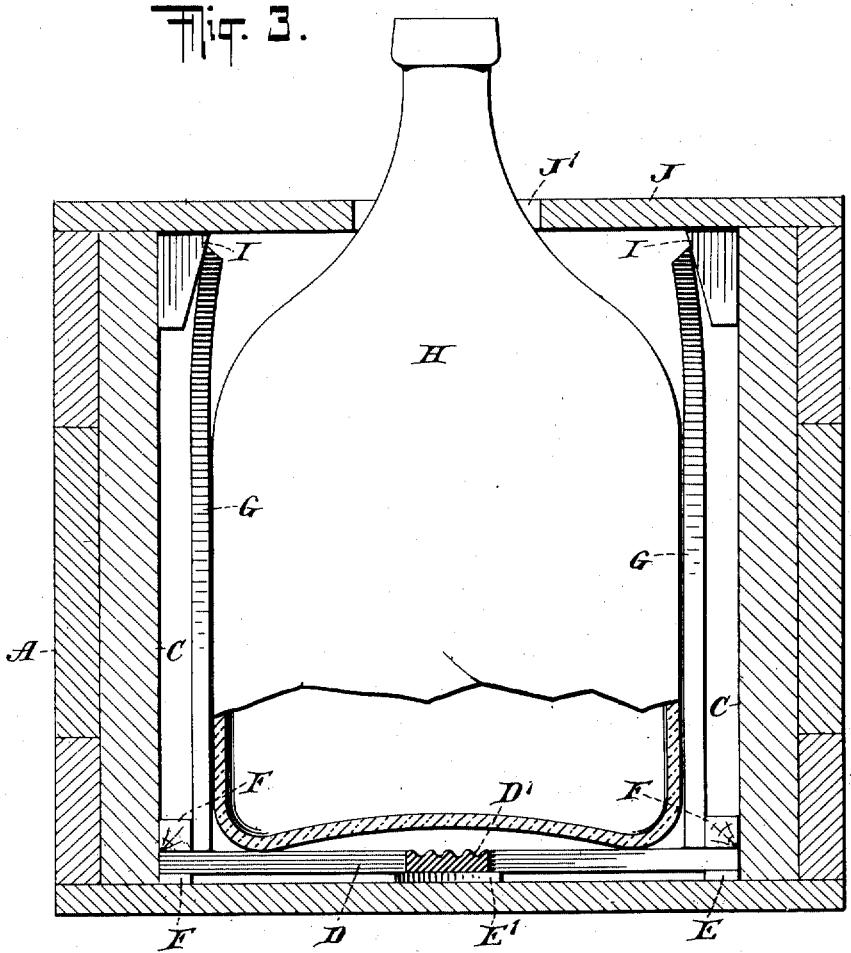
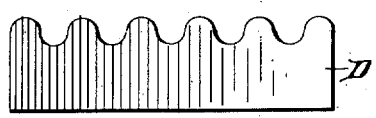
WITNESSES:
INVENTOR
ATTORNEYS

UNITED STATES PATENT OFFICE.

KARL F. STAHL, OF PITTSBURG, PENNSYLVANIA, ASSIGNOR TO GENERAL CHEMICAL COMPANY, OF NEW YORK, N. Y., A CORPORATION OF NEW YORK.

RECEPTACLE FOR CARBOYS.

1,000,449.  Specification of Letters Patent.  Patented Aug. 15, 1911.

Application filed June 25, 1908. Serial No. 440,208.

*To all whom it may concern:*

Be it known that I, KARL F. STAHL, a citizen of the United States, and resident of Pittsburg, Allegheny county, State of Pennsylvania, have invented certain new and useful Improvements in Receptacles for Carboys.

My invention relates to receptacles for containing and protecting carboys during transportation and has for its object to provide a receptacle of this kind which is cheap to manufacture and in which the carboy is firmly held throughout in such a manner as to reduce the danger of breakage to a minimum.

My invention will be fully described hereinafter and the features of novelty will be pointed out in the appended claims.

Reference is to be had to the accompanying drawings in which—

Figure 1 is a sectional view of the receptacle on the line 1—1 of Fig. 2; Fig. 2 is a plan view thereof; Fig. 3 is a view similar to Fig. 1 showing the complete package with the carboy in position therein; Fig. 4 is a plan view of one of the upright holding strips and Fig. 5 is a similar view of one of the horizontal holding strips.

A represents the usual outer crate or box open at the top and provided with the customary bottom B. Triangular corner pieces C project upwardly from the bottom B to the open top of the crate in each corner thereof, and are secured in position in any convenient manner as by nailing or screwing. Horizontal strips D, D' preferably made of soft wood having a certain amount of elasticity extend diagonally across the crate near the bottom thereof from one corner piece C to the other diagonally opposite. These strips D and D' have their ends and centers secured to supports E E' so as to be maintained at a distance from the bottom B. It will be noted that the strip D' is divided into two sections each of which projects from one of the corner pieces C to each edge of the strip D. Both strips D and D' are thus located in exactly the same horizontal plane throughout. The said strips D and D' are each further provided with corrugations or grooves which extend longitudinally thereof for the purpose to be more fully described hereinafter. Blocks F are located in each corner of the crate just above the strips D and D' and are fastened to the corner pieces C by any convenient or customary means.

G are strips of wood similar to the strips D and D' and corrugated in a like manner and have their lower ends secured to or braced against the blocks F as clearly shown in Figs. 1 and 3. The said strips G project upwardly adjacent to each corner of the crate and have their upper ends free and unsecured. Wedges I extending between each corner piece C and each strip G are arranged to firmly lock the carboy in position as will be more fully disclosed further on in the specification.

J is the cover adapted to close the open end of the crate after the carboy has been placed therein and is provided with a central opening J' for the accommodation of the neck of the carboy.

In use the parts are first all in the position shown in Fig. 1 and permit the carboy to be easily placed in said crate with the bottom of the carboy resting on the strips D and D' and the outside of said carboy throughout in engagement with each of the side strips G. The wedges I are now forced downwardly into the space between the outer surfaces of the strips G and the corner pieces C until the tops of said wedges are flush with the upper portion of the crate A. This forcing down of the wedges will cause the free ends of the strips G to be forced inwardly toward the center of the crate and will cause the said strips to be curved as shown in Fig. 3. In this condition the strips will hug the carboy and will securely clamp the carboy in position against horizontal and vertical movement. The cover T is now secured to the open end of the receptacle and serves as a medium for preventing the wedges from becoming dislocated or loosened. It is to be understood that the neck of the carboy extends through the opening J' without any packing and that said opening is somewhat larger than the neck, so that the neck is not in engagement with the cover at any point. The danger of breakage at this point due to sudden jars is thus obviated as the carboy is immovably held by the strips G after the wedges have been forced home.

By making the strips D, D' and G of a soft wood such as poplar for instance and providing such strips with longitudinal corrugations, all inequalities or uneven places in the glass will impress themselves in said strips, so that the carboy is firmly and evenly held throughout. It will be noticed that the bottom of the carboy engages the strips D, D' only at points between the supports E and E'. As the said strips are free and unsupported at these points and consequently somewhat elastic, the carboy is resiliently supported and thus protected against injury at these points. The strips G are also entirely free at the portions between the blocks F and the points of engagement with the wedges I. These strips G are therefore also elastic and will yield to any horizontal or swinging movement of the carboy.

It will be seen that in my improved receptacle the carboy is firmly held by means of yielding members and as these parts are preferably made of poplar wood the entire package is cheap and easy to manufacture. Further, as before stated, any inequalities in the glass will embed or impress themselves into the strips thus acting as a lock and aiding in maintaining the carboy in position. It will be seen also, that each side strip G is separately bent toward the carboy by its corresponding wedge I. Thus each such strip can be separately adjusted so that diametrically opposite strips can be adjusted relatively to one another to exert the proper degree of grip upon the carboy. Each wedge being located in a corner of the box A is prevented by two sides from slipping entirely away from behind the corresponding strip G, while at the same time being prevented by the cover J from slipping away in an upward direction. Moreover, by reason of the provision of a separate wedge for each side strip G, the package is very easily assembled and dismembered.

Various modifications may be made without departing from the nature of my invention as defined in the claims.

I claim:

1. In a receptacle for carboys, the combination of a plurality of upright strips arranged within the receptacle adjacent the walls thereof, means for preventing outward movement of the lower ends of the strips, and a plurality of wedges for independently forcing the upper ends of each of said strips inwardly, for clamping a carboy between the strips.

2. In a receptacle for carboys, the combination with a rectangular casing, of upright strips arranged opposite the corners of the casing, and a separate wedge for each strip adapted to be separately and independently forced between the strip and the walls of the casing for clamping a carboy between the strips.

3. In a receptacle for carboys, the combination with a receptacle or casing, of a plurality of upright strips, a plurality of wedges for independently forcing the upper ends of each of said strips inwardly for clamping a carboy between the strips, and a cover for the receptacle adapted to hold the wedges in place.

In testimony whereof I have signed this specification in the presence of two subscribing witnesses.

KARL F. STAHL.

Witnesses:
H. C. BEGGS,
WM. BITZER.